(12) United States Patent
Wang

(10) Patent No.: US 10,423,373 B2
(45) Date of Patent: Sep. 24, 2019

(54) REGENERATION CHIP AND CONTACT CONTROL METHOD THEREFOR

(71) Applicant: APEX MICROELECTRONICS CO., LTD., Zhuhai (CN)

(72) Inventor: Han Wang, Zhuhai (CN)

(73) Assignee: APEX MICROELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 15/968,233

(22) Filed: May 1, 2018

(65) Prior Publication Data

US 2018/0246688 A1    Aug. 30, 2018

Related U.S. Application Data

(63) Continuation of application No. PCT/CN2017/099417, filed on Aug. 29, 2017.

(30) Foreign Application Priority Data

Dec. 22, 2016  (CN) .......................... 2016 1 1196871
Dec. 22, 2016  (CN) .......................... 2016 2 1415080

(51) Int. Cl.
  *G06F 3/12*   (2006.01)
  *B41J 2/045*  (2006.01)
  *B41J 2/175*  (2006.01)

(52) U.S. Cl.
  CPC ........ *G06F 3/1236* (2013.01); *B41J 2/04541* (2013.01); *B41J 2/04586* (2013.01); *B41J 2/17526* (2013.01); *B41J 2/17546* (2013.01); *B41J 2/17559* (2013.01); *G06F 3/1219* (2013.01); *G06F 3/1279* (2013.01)

(58) Field of Classification Search
  CPC ................................ B41J 2/175; B41J 29/393
  See application file for complete search history.

(56) References Cited

U.S. PATENT DOCUMENTS 6,491,377 B1 *  12/2002  Cleland ................ B41J 2/04541
                                                                 347/50
2005/0036801 A1 *  2/2005  Burchette .......... G03G 21/1875
                                                                 399/109
2016/0339712 A1    11/2016  Quinn

FOREIGN PATENT DOCUMENTS

CN         104097401 A   10/2014
CN         203945811 U   11/2014
(Continued)

*Primary Examiner* — Ibrahim Siddo
(74) *Attorney, Agent, or Firm* — Anova Law Group, PLLC

(57) ABSTRACT

Embodiments of this application relate to the technical field of consumable chips, and provide a regeneration chip and a contact control method therefor. In this way, connection or disconnection between a printer connection contact and a native chip connection contact of the regeneration chip may be controlled, thereby avoiding problems of signal interference and collision that are caused because the regeneration chip and a native chip send signals to a printer at the same time. The regeneration chip comprises a printer connection contact, a native chip connection contact, and a switch signal end, where the native chip connection contact is connected to the printer connection contact via a switch circuit, the switch circuit is further connected to the switch signal end, and the switch circuit is configured to connect or disconnect the native chip connection contact to or from the printer connection contact under control of the switch signal end.

12 Claims, 2 Drawing Sheets

(56) References Cited

FOREIGN PATENT DOCUMENTS

| CN | 104441982 A | 3/2015 |
| CN | 106585104 A | 4/2017 |
| CN | 206317552 U | 7/2017 |

\* cited by examiner

REGENERATION CHIP AND CONTACT CONTROL METHOD THEREFOR

TECHNICAL FIELD

This application relates to the technical field of printing consumables and, in particular, to a regeneration chip and a contact control method therefor.

RELATED ART

For a consumable with a printhead, a consumable chip thereof may be further configured to control the printhead in addition to storing information such as a serial number. Therefore, when such consumable is recycled, a regeneration chip needs to interface with the native consumable chip, so that a contact of the native chip is connected to a contact of the regeneration chip.

In a process of implementing this application, it is found that at least the following problems exist in the prior art:

The regeneration chip uses a single-layer direct contact. That is, a printer is connected to the corresponding contacts of the native chip and the regeneration chip. In a communication process, the printer, by using the same contact, sends signals to and receives signals from the regeneration chip and the native chip. In this case, if the regeneration chip and the native chip send signals via the contact at the same time, mutual interference and collision of the signals may be caused. As a result, the printer cannot work normally.

SUMMARY

In view of this, embodiments of this application provide a regeneration chip and a contact control method therefor that can control connection or disconnection between a printer connection contact and a native chip connection contact of the regeneration chip, thereby avoiding problems of signal interference and collision that are caused by the regeneration chip and the native chip sending signals to the printer at the same time.

According to one aspect, an embodiment of this application provides a regeneration chip, comprising:

a printer connection contact, a native chip connection contact, and a switch signal end, where the native chip connection contact is connected to the printer connection contact via a switch circuit, the switch circuit is further connected to the switch signal end, and the switch circuit is configured to connect or disconnect the native chip connection contact to or from the printer connection contact under control of the switch signal end.

Specifically, the regeneration chip further comprises:

a switch control unit connected to the switch signal end, where the switch control unit is configured to control the switch circuit according to a data content sent to a printer by the regeneration chip or a native chip, or according to a data content that is received by the regeneration chip and that is sent by the printer.

Specifically, the regeneration chip further comprises a signal receive end and a signal output end, the signal receive end is connected to the printer connection contact;

the switch signal end comprises a first switch signal end and a second switch signal end; and the switch circuit comprises:

a first switching transistor, where a first end thereof is connected to the printer connection contact, a second end thereof is connected to the native chip connection contact, and a control end thereof is connected to the first switch signal end; and a gating unit, comprising a first gating end, a second gating end, a connection end, and a control end, where the first gating end is connected to the native chip connection contact, the second gating end is connected to the signal output end, the control end of the gating unit is connected to the second switch signal end, and the connection end is connected to the printer connection contact.

Specifically, the switch circuit further comprises:

a second switching transistor connected between the signal output end and the second gating end, where a first end thereof is connected to the signal output end, a second end thereof is connected to the second gating end, and a control end thereof is connected to the first switch signal end; and a third switching transistor connected between the connection end and the printer connection contact, where a first end of the third switching transistor is connected to the connection end, a second end thereof is connected to the printer connection contact, and a control end thereof is connected to the first switch signal end; and the first switching transistor is a first control-type switching transistor, the second switching transistor and the third switching transistor are second control-type switching transistors, and the first control-type switching transistor and the second control-type switching transistor are switching transistors having opposite effective control levels.

Specifically, the regeneration chip further comprises an internal signal end;

the switch signal end comprises a first switch signal end and a second switch signal end; and the switch circuit comprises:

a first switching transistor, where a first end thereof is connected to the internal signal end, a second end thereof is connected to the printer connection contact, and a control end thereof is connected to the first switch signal end; and a second switching transistor, where a first end thereof is connected to the printer connection contact, a second end thereof is connected to the native chip connection contact, and a control end thereof is connected to the second switch signal end.

Specifically, the switch control unit is further configured to output an on level to the first switch signal end when communication is completed or an information response action of a communication instruction ends.

According to another aspect, a contact control method for a regeneration chip is provided, where the regeneration chip comprises a printer connection contact, a native chip connection contact, and a switch signal end, the native chip connection contact is connected to the printer connection contact via a switch circuit, and the switch circuit is further connected to the switch signal end; and the method comprises:

connecting or disconnecting the native chip connection contact to or from the printer connection contact via the switch circuit 1 which is under control of the switch signal end.

Specifically, the regeneration chip further comprises:

a switch control unit connected to the switch signal end, where the switch control unit is configured to control the switch circuit according to a data content sent to a printer by the regeneration chip or a native chip, or according to a data content that is received by the regeneration chip and that is sent by the printer.

Specifically, the regeneration chip further comprises a signal receive end and a signal output end, the signal receive end is connected to the printer connection contact;

the switch signal end comprises a first switch signal end and a second switch signal end;

the switch circuit comprises:

a first switching transistor, where a first end thereof is connected to the printer connection contact, a second end thereof is connected to the native chip connection contact, and a control end thereof is connected to the first switch signal end; and a gating unit, comprising a first gating end, a second gating end, a connection end, and a control end, where the first gating end is connected to the native chip connection contact, the second gating end is connected to the signal output end, the control end of the gating unit is connected to the second switch signal end, and the connection end is connected to the printer connection contact; and the method comprises:

outputting an on level to the first switch signal end in response to a native chip receiving instruction;

in response to a native chip sending instruction, outputting an off level to the first switch signal end, and outputting, to the second switch signal end, a control signal that enables the first gating end to be on and enables the second gating end to be off; and in response to a regeneration chip sending instruction, outputting an off level to the first switch signal end, and outputting, to the second switch signal end, a control signal that enables the first gating end to be off and enables the second gating end to be on.

Specifically, the switch circuit further comprises:

a second switching transistor connected between the signal output end and the second gating end, where a first end thereof is connected to the signal output end, a second end thereof is connected to the second gating end, and a control end thereof is connected to the first switch signal end; and a third switching transistor connected between the connection end and the printer connection contact, where a first end of the third switching transistor is connected to the connection end, a second end thereof is connected to the printer connection contact, and a control end thereof is connected to the first switch signal end; where the first switching transistor is a first control-type switching transistor, the second switching transistor and the third switching transistor are second control-type switching transistors, and the first control-type switching transistor and the second control-type switching transistor are switching transistors having opposite effective control levels.

Specifically, the regeneration chip further comprises an internal signal end;

the switch signal end comprises a first switch signal end and a second switch signal end; the switch circuit comprises:

a first switching transistor, where a first end thereof is connected to the internal signal end, a second end thereof is connected to the printer connection contact, and a control end thereof is connected to the first switch signal end; and a second switching transistor, where a first end thereof is connected to the printer connection contact, a second end thereof is connected to the native chip connection contact, and a control end thereof is connected to the second switch signal end; and the method comprises:

in response to a regeneration chip sending instruction, outputting an on level to the first switch signal end, and outputting an off level to the second switch signal end; and in response to a native chip sending instruction, outputting an off level to the first switch signal end, and outputting an on level to the second switch signal end.

Specifically, the method further comprises:

outputting an on level to the first switch signal end when communication is completed or an information response action of a communication instruction ends.

According to the regeneration chip and the contact control method therefor that are provided in the embodiments of this application, the printer connection contact is connected to the native chip connection contact via the switch circuit. Therefore, when the printer needs to receive a signal sent by the regeneration chip rather than a signal sent by the native chip, the printer connection contact and the native chip connection contact are disconnected by using the switch circuit, so that the printer receives the signal that is sent by the regeneration chip via the printer connection contact, and will not receive the signal sent by the native chip, thereby avoiding problems of interference and collision between different signals.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

To better understand the technical solutions of this application, the embodiments of this application are described below in detail with reference to the accompanying drawings.

It should be clear that the described embodiments are merely some but not all of the embodiments of this application. All other embodiments obtained by a person of ordinary skill in the art based on the embodiments of this application without creative efforts shall fall within the protection scope of this application.

The terms used in the embodiments of this application are merely for describing specific embodiments, but are not intended to limit this application. "A", "the", and "said" in a singular form that are used in the embodiments of this application and the appended claims are intended to include a plural form, unless being clearly indicated to have other meanings in the context.

It should be understood that the term "and/or" used in this specification merely describes an association relationship for describing associated objects and represents that three relationships may exist. For example, A and/or B may represent the following three cases: only A exists, both A and B exist, and only B exists. In addition, the character "I" in this specification generally indicates an "or" relationship between the associated objects.

Embodiment 1

Figure 1:
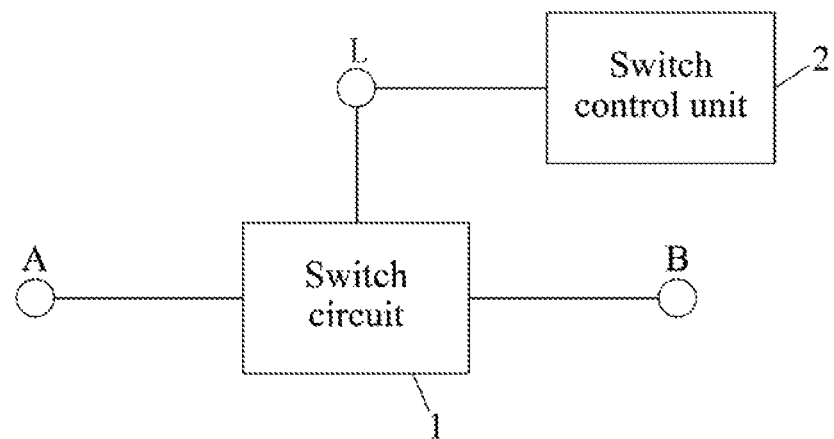
FIG. 1 is a schematic structural diagram of a regeneration chip according to an embodiment of this application.

As shown in FIG. 1, an embodiment of this application provides a regeneration chip, comprising a printer connection contact A, a native chip connection contact B, and a switch signal end L. The native chip connection contact B is connected to the printer connection contact A via a switch circuit 1. The switch circuit 1 is further connected to the switch signal end L, and is configured to connect or disconnect the native chip connection contact B to or from the printer connection contact A under control of the switch signal end L. Usually, the printer connection contact A is disposed on a front face of the regeneration chip used to connect to a printer, and the native chip connection contact B is disposed on a back face of the regeneration chip and is correspond to the printer connection contact A used to connect to the native chip. The regeneration chip is adhered to the native chip for use, and the native chip connection contact B is connected to a corresponding contact of the native chip, the printer connection contact A is connected to a corresponding contact of the printer. When the printer needs to send signals to both the native chip and the regeneration chip at the same time, the switch circuit 1 controls the native chip connection contact B connect to the printer connection contact A, in this way, the signals sent by the printer may be transmitted to the native chip and the regeneration chip. When the printer needs to receive a signal only sent by the regeneration chip rather than the native chip, the switch circuit 1 controls the native chip connection contact B disconnect from the printer connection contact A, that is, the printer only receives the signal sent by the regeneration chip through the printer connection contact A, and would not receive the signal sent by the native chip, thereby avoiding problems of collision between different signals.

Specifically, the regeneration chip further comprises a switch control unit 2 connected to the switch signal end L. The switch control unit 2 is configured to generate a corresponding control level according to a data content sent to the printer by the regeneration chip or the native chip or according to a data content received by the regeneration chip from the printer, and output the corresponding control level to a control end of the switch circuit 1, so as to achieve control the switch circuit 1. For example, the switch control unit 2 obtains the data content that is sent to the regeneration chip or the native chip by the printer, and the content comprises an instruction instructing to obtain a serial number. In this case, the regeneration chip needs to send a corresponding serial number without enabling the native chip to send a serial number. Therefore, the switch control unit 2 sends a corresponding control level to the switch circuit 1 to disconnect the native chip connection contact B from the printer connection contact A. In this case, even if the native chip receives the instruction and generates a serial number, the serial number cannot be sent to the printer. If the switch control unit 2 obtains the data content that is sent to the regeneration chip or the native chip by the printer, and the content comprises instructing to send a printhead control instruction within a next sending period, it is need to let the native chip receive the printhead control instruction, so as to control the printhead. Therefore, the switch control unit 2 sends a corresponding control level to the switch circuit 1 to connect the native chip connection contact B to the printer connection contact A. That is, when the next sending period arrives, the native chip can receive the printhead control instruction. Similarly, the native chip needs to pass through the regeneration chip to send data to the printer. In this case, the switch control unit 2 obtains the data content, and if the data content comprises instructing the printer to receive particular information in a next period, and the particular information needs to be sent by one of the regeneration chip or the native chip, the switch control unit 2 can send a corresponding control level to the switch circuit 1 according to the particular information sent requirements, so that the printer can receive, in the next period, data sent from a particular chip.

The regeneration chip in this embodiment connects the printer connection contact to the native chip connection contact via the switch circuit. Therefore, when the printer needs to receive the signal sent by the regeneration chip rather than the native chip, the switch circuit disconnect the printer connection contact from the native chip connection contact, so that the printer receives the signal that is sent by the regeneration chip through the printer connection contact, and will not receive the signal sent by the native chip, thereby avoiding problems of interference and collision between different signals.

Embodiment 2

Figure 2:
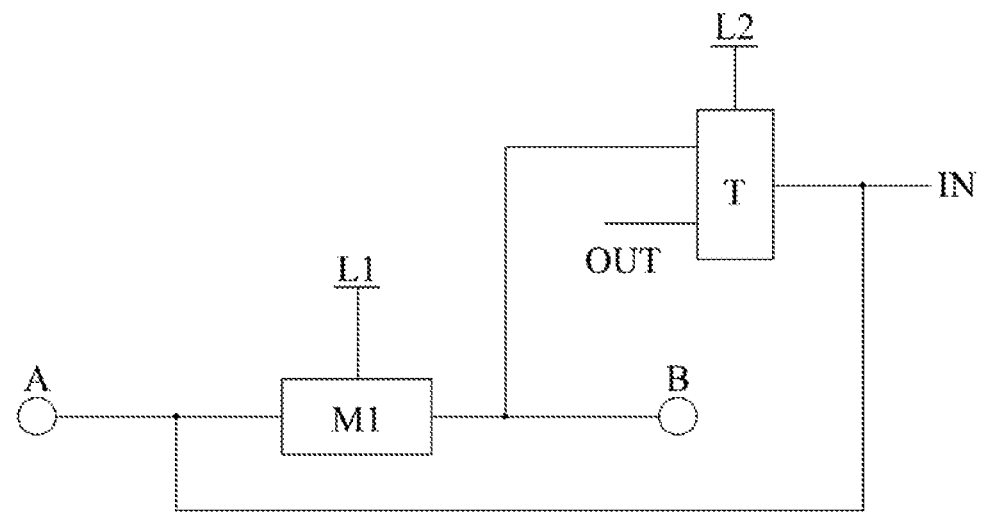
FIG. 2 is a schematic structural diagram of another regeneration chip according to an embodiment of this application.

As shown in FIG. 2, on the basis of Embodiment 1, the regeneration chip further comprises a signal receive end IN and a signal output end OUT. The signal receive end IN is connected to the printer connection contact A. The switch signal end L comprises a first switch signal end L1 and a second switch signal end L2. The switch circuit 1 comprises: a first switching transistor M1, where a first end thereof is connected to the printer connection contact A, a second end thereof is connected to the native chip connection contact B, and a control end thereof is connected to the first switch signal end L1; and a gating unit T that comprises a first gating end, a second gating end, a connection end, and a control end, where the first gating end is connected to the native chip connection contact B, the second gating end is connected to the signal output end OUT, the control end of the gating unit T is connected to the second switch signal end L2, and the connection end is connected to the printer connection contact A.

In this embodiment, the regeneration chip receives a signal from the printer connection contact A via the signal receive end IN, and outputs an internal signal to the printer connection contact A via the signal output end OUT. Due to the signal receive end IN of the regeneration chip is always connected to the printer connection contact A, the regeneration chip may always receive a communication instruction and information sent by the printer to determine whether it is need to allow the native chip receive or send a signal. When it is need the native chip to receive the information sent by the printer, the regeneration chip outputs an on level to the first switch signal end L1, so as to enable the first switching transistor M1 to be on. In this case, the printer connection contact A and the native chip connection contact B are connected, and the information sent by the printer may be transmitted to the native chip. When it is need the native chip to send information to the printer, the regeneration chip outputs an off level to the first switch signal end L1 to enable the first switching transistor M1 to be off; and sends a control signal to the second switch signal end L2 that enables the first gating end to be on and enables the second gating end to be off. In this case, the native chip sends the signal to the printer connection contact A via the native chip connection contact B and the gating unit T, so that the information of the native chip may be transmitted to the printer. When it is need the regeneration chip to send information to the printer, the regeneration chip outputs an off level to the first switch signal end L1 to enable the first switching transistor M1 to be off, and sends a control signal to the second switch signal end that enables the first gating end to be off and enables the second gating end to be on. In this case, the regeneration chip may send the information to the printer connection contact A via the signal output end OUT and the gating unit T, so that the information of the regeneration chip may be transmitted to the printer. Meanwhile, due to the first switching transistor M1 is off, the native chip cannot send information to the printer at the same time, thereby avoiding problems of interference and collision between different signals.

Embodiment 3

Figure 3:
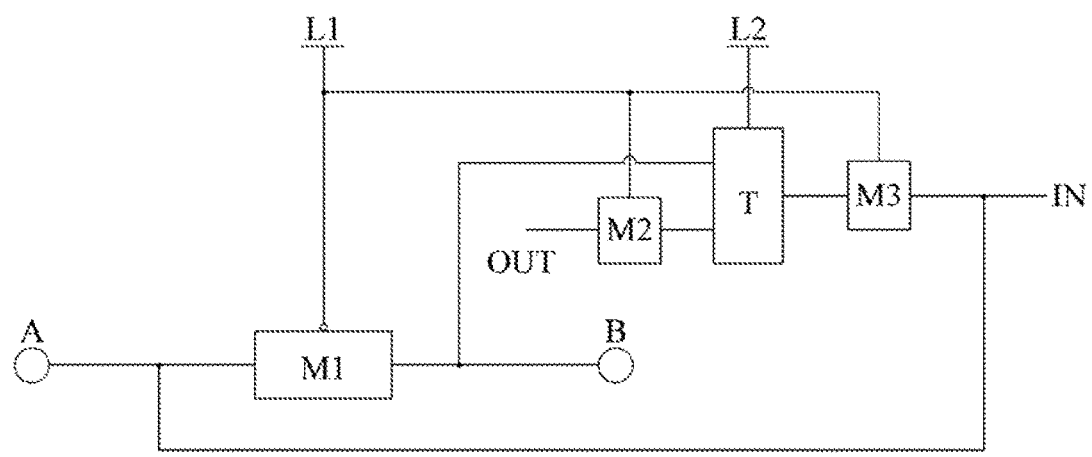
FIG. 3 is a schematic structural diagram of another regeneration chip according to an embodiment of this application.

As shown in FIG. 3, on the basis of Embodiment 2, the switch circuit further comprises: a second switching transistor M2 connected between the signal output end OUT and the second gating end, where a first end thereof is connected to the signal output end OUT, a second end thereof is connected to the second gating end, and a control end thereof is connected to the first switch signal end L1; and a third switching transistor M3 connected between the connection end and the printer connection contact A, where a first end thereof is connected to the connection end, a second end thereof is connected to the printer connection contact A, and a control end thereof is connected to the first switch signal end L1. The first switching transistor M1 is a first control-type switching transistor, the second switching transistor M2 and the third switching transistor M3 are second control-type switching transistors, and the first control-type switching transistor and the second control-type switching transistor are switching transistors having opposite effective control levels. For example, the first switching transistor M1 is on at a low level, and the second switching transistor M2 and the third switching transistor M3 are on at a high level.

The circuit control method in this embodiment is the same as that in Embodiment 2, and the differences are that: when the regeneration chip controls the first switching transistor M1 to be on, the second switching transistor M2 and the third switching transistor M3 are off; and when the first switching transistor M1 is off, the second switching transistor M2 and the third switching transistor M3 are on. In this way, it may be further ensured that when the native chip sends information to the printer, the signal output end OUT of the regeneration chip cannot output a signal to a connection terminal A of the printer, and when the regeneration chip sends information to the printer, the native chip cannot output a signal to the connection terminal A of the printer.

Embodiment 4

Figure 4:
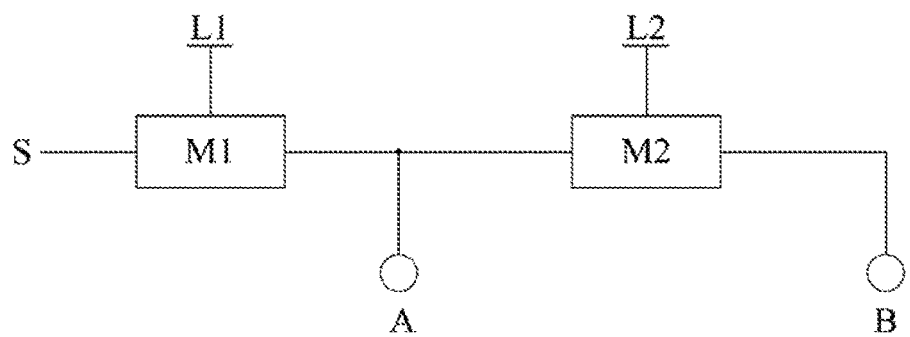
FIG. 4 is a schematic structural diagram of another regeneration chip according to an embodiment of this application.

As shown in FIG. 4, on the basis of Embodiment 1, the regeneration chip further comprises an internal signal end S. The switch signal end comprises the first switch signal end L1 and the second switch signal end L2. The switch circuit comprises: a first switching transistor M1, where a first end thereof is connected to the internal signal end S, a second end thereof is connected to the printer connection contact A, and a control end thereof is connected to the first switch signal end L1; and a second switching transistor M2, where a first end thereof is connected to the printer connection contact A, a second end thereof is connected to the native chip connection contact B, and a control end thereof is connected to the second switch signal end L2. In this embodiment, the regeneration chip sends or receives signal via the internal signal end S. When the regeneration chip needs to send a signal to the printer, the regeneration chip outputs an on level to the first switch signal end L1 to enable the first switching transistor M1 to be on; and outputs an off level to the second switch signal end L2 to enable the second switching transistor M2 to be off. The regeneration chip sends the signal to the printer connection contact A via the internal signal end S and the first switching transistor M1, while the signal of the native chip cannot be sent. When it is need the native chip to send a signal to the printer, the regeneration chip outputs an off level to the first switch signal end L1 to enable the first switching transistor M1 to be off; and outputs an on level to the second switch signal end L2 to enable the second switching transistor M2 to be on. The native chip sends the signal to the printer connection contact A via the native chip connection contact B and the second switching transistor M2, while the signal of the regeneration chip cannot be sent. When it is need the native chip and the regeneration chip to receive the signal sent by the printer at the same time, the regeneration chip outputs an on level to both the first switch signal end L1 and the second switch signal end L2 to enable both the first switching transistor M1 and the second switching transistor M2 to be on. Therefore, both the native chip and the regeneration chip can receive the information sent by the printer.

Specifically, the switch control unit 2 is further configured to output the on level to the first switch signal end L1 when communication is completed or an information response action of a communication instruction ends.

In a process of communication between the printer and a chip, initially, the regeneration chip outputs the on level to the first switch signal end L1, so that the information sent by the printer can be transmitted to the internal signal end S, and the regeneration chip determines, according to the communication instruction or the information sent by the printer, whether it is need to allow the native chip receive or send signal; when need a single chip to send the information to the printer, the regeneration chip controls one of the first switching transistor M1 and the second switching transistor M2 to be on and the other one to be off to perform an action of sending the information; and after communication is completed once or an information response action of a communication instruction ends once, the regeneration chip outputs the on level to the first switch signal end L1, so as to continue to receive the communication instruction or the information sent by the printer during next communication. In this process, the printer will not receive the information sent by the native chip and the regeneration chip at the same time, thereby avoiding problems of interference and collision between different signals.

It should be noted that in the foregoing embodiments, a switching transistor may be a switching component such as a metal-oxide-semiconductor field-effect transistor (MOSFET) or a triode, and the gating unit may be a selective control circuit comprising multiple MOSFETs or triodes.

Embodiment 5

A contact control method for a regeneration chip is provided in this embodiment. As shown in FIG. 1, the regeneration chip comprises a printer connection contact A, a native chip connection contact B, and a switch signal end L. The native chip connection contact B is connected to the printer connection contact A via a switch circuit 1, and the switch circuit 1 is further connected to the switch signal end L. The method comprises: connecting or disconnecting the native chip connection contact B to or from the printer connection contact A via the switch circuit 1 which is under control of the switch signal end L.

It should be noted that a specific structure and principles of the regeneration chip in this embodiment are the same as those in Embodiment 1, and details are not described herein again.

According to the contact control method for a regeneration chip provided in this embodiment, the printer connection contact is connected to the native chip connection contact via the switch circuit. Therefore, when the printer needs to receive a signal sent by the regeneration chip rather than a signal sent by the native chip, the switch circuit controls the printer connection contact disconnect from the native chip connection contact, so that the printer receives the signal that is sent by the regeneration chip via the printer connection contact, and will not receive the signal sent by the native chip, thereby avoiding problems of interference and collision between different signals.

Embodiment 6

On the basis of Embodiment 5, as shown in FIG. 2, the regeneration chip further comprises a signal receive end IN and a signal output end OUT. The signal receive end IN is connected to the printer connection contact A. The switch signal end L comprises a first switch signal end L1 and a second switch signal end L2. The switch circuit comprises: a first switching transistor M1, where a first end thereof is connected to the printer connection contact A, a second end thereof is connected to the native chip connection contact B, and a control end thereof is connected to the first switch signal end L1; and a gating unit T that comprises a first gating end, a second gating end, a connection end, and a control end, wherein the first gating end is connected to the native chip connection contact B, the second gating end is connected to the signal output end OUT, the control end of the gating unit T is connected to the second switch signal end L2, and the connection end is connected to the printer connection contact A.

The method comprises: outputting an on level to the first switch signal end L1 in response to a native chip receiving instruction, so as to enable the first switching transistor M1 to be on; in response to a native chip sending instruction, outputting an off level to the first switch signal end L1, and outputting, to the second switch signal end L2, a control signal that enables the first gating end to be on and enables the second gating end to be off; and in response to a regeneration chip sending instruction, outputting an off level to the first switch signal end L1, and outputting, to the second switch signal end L2, a control signal that enables the first gating end to be off and enables the second gating end to be on.

It should be noted that a specific structure and principles of the regeneration chip in this embodiment are the same as those in Embodiment 2, and details are not described herein again.

Embodiment 7

On the basis of Embodiment 6, as shown in FIG. 3, the switch circuit further comprises: a second switching transistor M2 connected between the signal output end OUT and the second gating end, where a first end thereof is connected to the signal output end OUT, a second end thereof is connected to the second gating end, and a control end thereof is connected to the first switch signal end L1; and a third switching transistor M3 connected between the connection end and the printer connection contact A, where a first end thereof is connected to the connection end, a second end thereof is connected to the printer connection contact A, and a control end thereof is connected to the first switch signal end L1. The first switching transistor M is a first control-type switching transistor, the second switching transistor M2 and the third switching transistor M3 are second control-type switching transistors, and the first control-type switching transistor and the second control-type switching transistor are switching transistors having opposite effective control levels.

The circuit control method in this embodiment is the same as that in Embodiment 2, and the differences are that: when the first switching transistor M1 is controlled to be on, the second switching transistor M2 and the third switching transistor M3 are off; and when the first switching transistor M1 is off, the second switching transistor M2 and the third switching transistor M3 are on. In this way, it may be further ensured that when the native chip sends information to the printer, the signal output end OUT of the regeneration chip cannot output a signal to the printer connection contact A, and when the regeneration chip sends information to the printer, the native chip cannot output a signal to the printer connection contact A.

Embodiment 8

On the basis of Embodiment 5, as shown in FIG. 4, the regeneration chip further comprises an internal signal end S. The switch signal end comprises a first switch signal end L1 and a second switch signal end L2. The switch circuit comprises: a first switching transistor M1, where a first end thereof is connected to the internal signal end S, a second end thereof is connected to the printer connection contact A, and a control end thereof is connected to the first switch signal end L1; and a second switching transistor M2, where a first end thereof is connected to the printer connection contact A, a second end thereof is connected to the native chip connection contact B, and a control end thereof is connected to the second switch signal end L2. The method comprises: in response to a regeneration chip sending instruction, outputting an on level to the first switch signal end L1, and outputting an off level to the second switch signal end L2; and in response to a native chip sending instruction, outputting an off level to the first switch signal end L1, and outputting an on level to the second switch signal end L2.

Specifically, the method further comprises: outputting the on level to the first switch signal end L1 when communication is completed or an information response action of a communication instruction ends.

It should be noted that a specific structure and principles of the regeneration chip in this embodiment are the same as those in Embodiment 4, and details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and comprises several instructions for instructing a computer apparatus (which may be a personal computer, a server, or a network apparatus) or a processor to perform a part of the steps of the methods described in the embodiments of this application. The foregoing storage medium comprises: any medium that can store program code, such as a USB flash drive, a removable hard disk, a read-only memory (ROM), a random access memory (RAM), a magnetic disk, or an optical disc.

The foregoing descriptions are merely exemplary embodiments of this application, but are not intended to limit this application. Any modification, equivalent replacement, or improvement made without departing from the spirit and principle of this application should fall within the protection scope of this application.

The invention claimed is:

1. A regeneration chip, comprising:
a printer connection contact;
a native chip connection contact; and
a switch signal end, wherein:
the native chip connection contact is connected to the printer connection contact via a switch circuit;
the switch circuit is further connected to the switch signal end; and
the switch circuit is configured to connect or disconnect the native chip connection contact to or from the printer connection contact under control of the switch signal end, wherein:
when a printer needs to send a signal to both a native chip and the regeneration chip at the same time, the switch circuit is configured to connect the native chip connection contact to the printer connection contact, and
when the printer needs to receive the signal only sent by the regeneration chip rather than the native chip, the switch circuit is configured to disconnect the native chip connection contact from the printer connection contact.

2. The regeneration chip according to claim 1, further comprising:
a switch control unit connected to the switch signal end, wherein the switch control unit is configured to control the switch circuit according to a data content sent to a printer by the regeneration chip or a native chip, or according to a data content that is received by the regeneration chip and that is sent by a printer.

3. A regeneration chip, comprising:
a printer connection contact;
a native chip connection contact; and
a switch signal end, wherein:
the native chip connection contact is connected to the printer connection contact via a switch circuit;
the switch circuit is further connected to the switch signal end; and
the switch circuit is configured to connect or disconnect the native chip connection contact to or from the printer connection contact under control of the switch signal end, wherein:
the regeneration chip further comprises a signal receive end and a signal output end, the signal receive end is connected to the printer connection contact;
the switch signal end comprises a first switch signal end and a second switch signal end; and
the switch circuit comprises:
a first switching transistor, wherein a first end thereof is connected to the printer connection contact, a second end thereof is connected to the native chip connection contact, and a control end thereof is connected to the first switch signal end; and
a gating unit, comprising a first gating end, a second gating end, a connection end, and a control end, wherein the first gating end is connected to the native chip connection contact, the second gating end is connected to the signal output end, the control end of the gating unit is connected to the second switch signal end, and the connection end is connected to the printer connection contact.

4. The regeneration chip according to claim 3, wherein:
the switch circuit further comprises:
a second switching transistor connected between the signal output end and the second gating end, wherein a first end thereof is connected to the signal output end, a second end thereof is connected to the second gating end, and a control end thereof is connected to the first switch signal end; and
a third switching transistor connected between the connection end and the printer connection contact, wherein a first end of the third switching transistor is connected to the connection end, a second end thereof is connected to the printer connection contact, and a control end thereof is connected to the first switch signal end; and
the first switching transistor is a first control-type switching transistor, the second switching transistor and the third switching transistor are second control-type switching transistors, and the first control-type switching transistor and the second control-type switching transistor are switching transistors having opposite effective control levels.

5. The regeneration chip according to claim 2, wherein:
the regeneration chip further comprises an internal signal end;
the switch signal end comprises a first switch signal end and a second switch signal end; and the switch circuit comprises:
a first switching transistor, wherein a first end thereof is connected to the internal signal end, a second end thereof is connected to the printer connection contact, and a control end thereof is connected to the first switch signal end; and
a second switching transistor, wherein a first end thereof is connected to the printer connection contact, a second end thereof is connected to the native chip connection contact, and a control end thereof is connected to the second switch signal end.

6. The regeneration chip according to claim 5, wherein:
the switch control unit is further configured to output an on level to the first switch signal end when communication is completed or an information response action of a communication instruction ends.

7. A contact control method for a regeneration chip, wherein the regeneration chip comprises a printer connection contact, a native chip connection contact, and a switch signal end, the native chip connection contact is connected to the printer connection contact via a switch circuit, and the switch circuit is further connected to the switch signal end, the method comprising:
connecting or disconnecting the native chip connection contact to or from the printer connection contact via the switch circuit which is under control of the switch signal end, wherein:
when a printer needs to send a signal to both a native chip and the regeneration chip at the same time, the switch circuit is configured to connect the native chip connection contact to the printer connection contact, and
when the printer needs to receive the signal only sent by the regeneration chip rather than the native chip, the switch circuit is configured to disconnect the native chip connection contact from the printer connection contact.

8. The method according to claim 7, wherein the regeneration chip further comprises:
a switch control unit connected to the switch signal end, wherein the switch control unit is configured to control the switch circuit according to a data content sent to a printer by the regeneration chip or a native chip, or according to a data content that is received by the regeneration chip and that is sent by the printer.

9. The method according to claim 7, wherein
the regeneration chip further comprises a signal receive end and a signal output end, the signal receive end is connected to the printer connection contact;
the switch signal end comprises a first switch signal end and a second switch signal end;
the switch circuit comprises:
a first switching transistor, wherein a first end thereof is connected to the printer connection contact, a second end thereof is connected to the native chip connection contact, and a control end thereof is connected to the first switch signal end; and
a gating unit, comprising a first gating end, a second gating end, a connection end, and a control end, wherein the first gating end is connected to the native chip connection contact, the second gating end is connected to the signal output end, the control end of the gating unit is connected to the second switch signal end, and the connection end is connected to the printer connection contact; and the method comprises:
outputting an on level to the first switch signal end in response to a native chip receiving instruction;
in response to a native chip sending instruction, outputting an off level to the first switch signal end, and outputting, to the second switch signal end, a control signal that enables the first gating end to be on and enables the second gating end to be off; and
in response to a regeneration chip sending instruction, outputting an off level to the first switch signal end, and outputting, to the second switch signal end, a control signal that enables the first gating end to be off and enables the second gating end to be on.

10. The method according to claim 9, wherein
the switch circuit further comprises:
a second switching transistor connected between the signal output end and the second gating end, wherein a first end thereof is connected to the signal output end, a second end thereof is connected to the second gating end, and a control end thereof is connected to the first switch signal end; and
a third switching transistor connected between the connection end and the printer connection contact, wherein a first end of the third switching transistor is connected to the connection end, a second end thereof is connected to the printer connection contact, and a control end thereof is connected to the first switch signal end; wherein
the first switching transistor is a first control-type switching transistor, the second switching transistor and the third switching transistor are second control-type switching transistors, and the first control-type switching transistor and the second control-type switching transistor are switching transistors having opposite effective control levels.

11. The method according to claim 7, wherein
the regeneration chip further comprises an internal signal end;
the switch signal end comprises a first switch signal end and a second switch signal end;
the switch circuit comprises:
a first switching transistor, wherein a first end thereof is connected to the internal signal end, a second end thereof is connected to the printer connection contact, and a control end thereof is connected to the first switch signal end; and
a second switching transistor, wherein a first end thereof is connected to the printer connection contact, a second end thereof is connected to the native chip connection contact, and a control end thereof is connected to the second switch signal end; and
the method comprises:
in response to a regeneration chip sending instruction, outputting an on level to the first switch signal end, and outputting an off level to the second switch signal end; and
in response to a native chip sending instruction, outputting an off level to the first switch signal end, and outputting an on level to the second switch signal end.

12. The method according to claim 11, further comprising:
outputting an on level to the first switch signal end when communication is completed or an information response action of a communication instruction ends.

* * * * *